June 29, 1937. L. MYERS 2,085,381
DISHER
Filed June 27, 1936 2 Sheets-Sheet 1
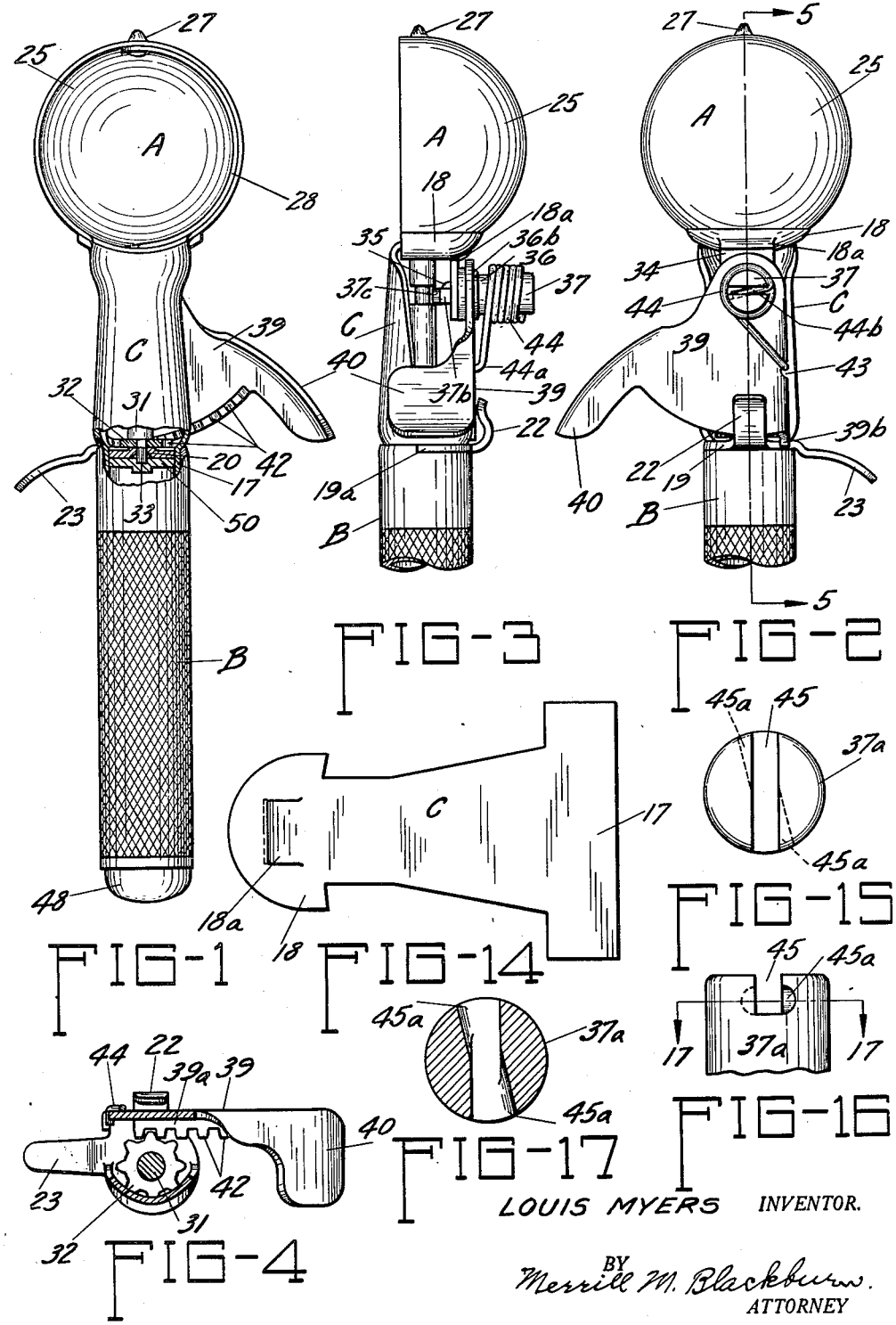
LOUIS MYERS INVENTOR.
BY Merrill M. Blackburn.
ATTORNEY

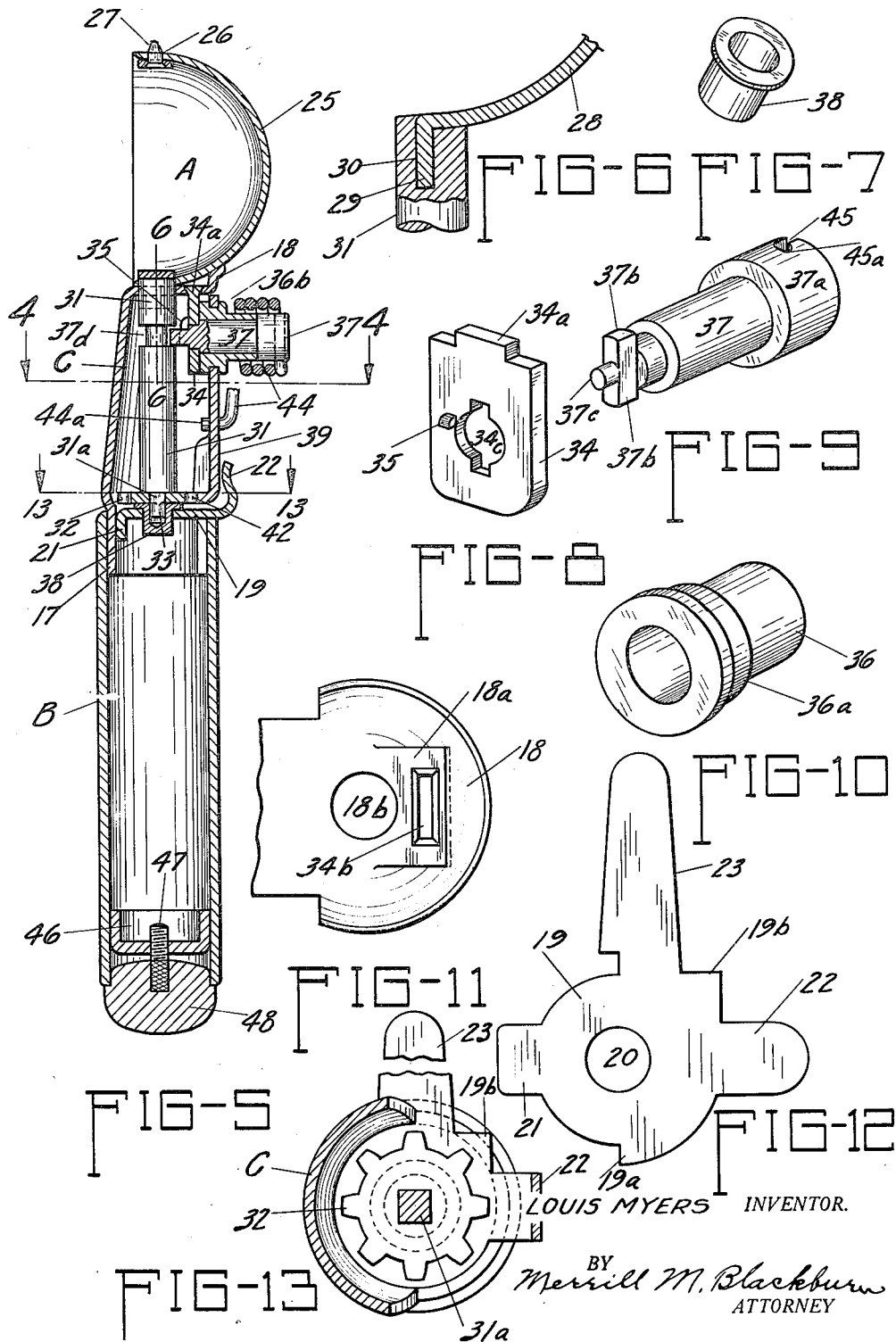

Patented June 29, 1937

2,085,381

UNITED STATES PATENT OFFICE 2,085,381

DISHER

Louis Myers, Galesburg, Ill., assignor to Myers Manufacturing Company, Galesburg, Ill., a corporation of Illinois Application June 27, 1936, Serial No. 87,721

4 Claims. (Cl. 107—48)

This invention relates to improvements in dishers or ladles and, more especially, a self-emptying disher or ladle of the type commonly used in dispensing ice cream and other semi-solid materials. This disclosure comprises improvements upon the structure disclosed in my Patent No. 2,041,200, issued May 19, 1936.

Among the objects of this invention are the provision of a disher that can be easily and cheaply manufactured; the provision of a disher which can be formed from sheet material and is simple, efficient, and strong in construction and operation; the provision of a disher which can be readily assembled and disassembled, thus facilitating cleaning and repairing; the provision of a disher having a water-tight handle; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 represents a top plan of one form of my improved disher, partly broken away to show internal construction;

Figs. 2 and 3 represent a bottom plan and a side elevation of the structure shown in Fig. 5, the handle being shown fragmentarily;

Fig. 4 represents a section taken substantially along the plane indicated by the line 4—4, Fig. 5;

Fig. 5 represents a longitudinal section through an improved form of the complete disher, taken substantially along the plane indicated by the line 5—5, Fig. 2;

Fig. 6 represents a fragmentary section of the rotary releasing device;

Fig. 7 is an enlarged perspective of a bearing member shown at the middle of Fig. 5;

Fig. 8 is an enlarged perspective of an element connected near the bowl of the disher and serving as a connecting means to hold in place the actuating handle for the member shown fragmentarily in Fig. 6;

Fig. 9 is an enlarged perspective of a bearing pin cooperating with the element shown in Fig. 8;

Fig. 10 is an enlarged perspective of a sleeve in which the reduced portion of the structure shown in Fig. 9 is mounted and which serves for pivotally mounting the actuating means for the scraper;

Fig. 11 represents an enlarged face view of the member to which the bowl of the disher is secured;

Fig. 12 represents an enlarged plan of the blank from which the handle seal is formed;

Fig. 13 represents a transverse section, enlarged, taken substantially along the plane indicated by the line 13—13, Fig. 5;

Fig. 14 is a plan of the blank from which the bridging member is formed;

Fig. 15 is a plan of the head of the pin shown in Fig. 9;

Fig. 16 is a fragmentary elevation of the structure shown in Fig. 15;

Fig. 17 represents a section taken substantially along the plane 17—17, Fig. 16.

In the annexed drawings, the disher includes, primarily, the bowl or scoop portion A equipped with a scraper, a knurled tubular handle portion B, a bridging member C connecting the bowl to the handle, and suitable scraper-actuating mechanism. The bowl A and bridging member C may be pressed or drawn out of sheet metal previously stamped into suitable blanks, and the handle B may be tubular material.

The bridging member C has one end tubular, as indicated at 17, so that it may be inserted into one end of the tubular handle and fastened as by soldering or brazing. The other end is provided with a lip 18 suitably concaved to fit against the bowl A, and this end is fastened to the bowl as by soldering or brazing. The intermediate or major portion of the bridging member C is concavo-convex in form to give it strength. Fig. 14 shows the blank from which the member C is formed.

In Fig. 12 I have shown a blank from which I form a closure for the forward end of the handle. This blank has a body 19 provided with a central opening 20 and fingers 21, 22, and 23. The finger 21 is bent downwardly and the finger 22 upwardly, as shown most clearly in Fig. 5. As shown in Figs. 1 and 2, the finger 23 extends laterally from the handle and is somewhat curved to more or less fit a finger pressed against it during the scooping operation. The body 19 is provided with a projection 19a which, as shown in Fig. 3, bears against a shoulder at the forward end of the handle. The finger 21 is inside of the sleeve 17 and secured thereto in a suitable manner, as by soldering or brazing. The body 19 is secured to the end of the handle in water-tight relation. A shoulder 19b serves as a stop for the operating lever, and cooperates with a stop 39b formed on the lever 39, as shown in Fig. 2, to limit the swinging of the lever in one direction.

The scoop A comprises a hemispherical bowl 25 having a perforation 26 on the side opposite the handle to receive an extension pin 27 of the scraper 28, adapted to be oscillated along the inner surface of the bowl. The curved scraper is provided at the handle end with an angularly arranged extension 29 adapted to seat in the slot 30 in the end of the shaft 31. This scraper shaft has a bearing in the bowl A and in the lip or bowl-supporting section 18 of the member C. Near the other end of the shaft 31 is a gear 32, provided with an angular hole for the reception of a similarly shaped portion 31a of the shaft 31. Suitable means is provided for rotating the shaft 31 to swing the scraper 28 in the bowl A for the purpose of loosening the contents thereof in the usual manner.

An opening 18b is formed in the lip 18 of the bridging member C for the reception of the shaft 31, provided at its rearward end with a cylindrical portion 33, rotatably mounted in the socket formed in the element 38, shown in Fig. 7. This socket 38 is mounted in the opening 20 in member 19, as will clearly appear from Figs. 5 and 12. An apertured bracket 34 extends from the bowl and supports a handle 39 and a spring 44. As shown in the drawings, this bracket is supported by having its extension 34a inserted in the opening 34b in element 19 and riveted therein. As clearly shown in Fig. 8, one side of the bracket is provided, adjacent the opening 34c, for a purpose to be explained, with a small abutment 35. A lever-supporting bushing 36, having a slight enlargement 36a, is inserted through an opening in the actuating lever 39 and is secured in place therein by having the end of this enlargement pressed inwardly against the lever 39 and expanded, as shown at 36b in Figs. 3 and 5. A pivot pin, having a body 37 and a head 37a, is passed through the lever-supporting bushing or sleeve 36 and opening 34c, the ends 37b passing through the angular extensions from the circular part of this opening. When this pin is rotated through ninety degrees (90°), about its longitudinal axis, one of the ends 37b engages the abutment or stop lug 35 and prevents further rotation. Now, since the end of body 37 presses against one side of bracket 34, since a smaller cylindrical part extends through the opening 34c, and since the ends 37b engage the opposite face of bracket 34, these parts will be held in assembled relation, as shown in Fig. 5. An extension 37c extends beyond the cross head formed by the ends 37b and into the groove 37d of the shaft 31. This projection prevents reciprocation of shaft 31, as will be obvious. It may be cylindrical, as shown, and it will then be possible to have a closer fit between the projection and the edges of the groove 37d than if made angular in cross section, with a consequent decrease in the amount of longitudinal play which the shaft 31 may have. The pin 37 is held in assembled position by means of the spring 44, to be referred to more in detail hereinafter.

A lever 39, formed from sheet metal and having a portion 40 for engagement by a thumb or finger for actuation thereof, is secured to the sleeve 36, as indicated above, and the two, in reality, constitute a single unit and may be handled as such. The lever 39 has an edge turned down, as shown at 39a, and along this edge are formed gear-teeth 42 which mesh with the gear 32, secured to the angular portion 31a of the shaft 31. A notch 43 is formed in the edge of the lever 39, as shown most clearly in Fig. 2, to receive the end 44a of the spring 44, by means of which the lever 39 is actuated in one direction. As is clear from Figs. 2 and 3, the spring 44 is a coiled spring arranged about the sleeve 36 and head 37a and has its end 44b secured in the slot 45 in the head 37a. As indicated at 45a, there is an undercut in the head 37a which cooperates with the end 44b to hold the spring in place. When the end 44b of spring 44 is inserted in slot 45 and end 44a is swung over to engage notch 43, pin 37 is held against rotation and the parts are kept in proper assembled relation, the end 44b being kept in place by the undercut 45a.

The spring is positioned to yieldably urge the scraper 28 to its normal position, as shown in Fig. 1, where the scraper is at one edge of the bowl. It will be understood that swinging the lever by suitable pressure upon the portion 40 will cause the rack to rotate the gear 32 whereby to actuate the scraper about its pivot. Normally, the lever 39 does not bear against the member 22 unless the disher is being used to dip unusually resistant material. In such a case, the member 22 serves to retain the lever in its proper position and to prevent the gear teeth from separating. When swinging the lever 39, the sleeve 36 turns with the lever on the pin 37, and these two, therefore, furnish a large bearing surface to reduce wear of these parts from use. Also part of spring 44 turns with sleeve 36, thus reducing wear.

Within the rearward end of the handle B is secured a cap 46 provided with a central threaded opening for the reception of the screw-threaded member 47 about which is moulded the finishing member 48 for the handle. These finishing members are made in various colors to designate different sizes of the dipper part of the dishers, so that when several dishers are standing in a jar of water, the person using them may tell at a glance at the knobs 48 just which one he wants. It will not be necessary to remove them from the water, as the color clearly indicates the size of the dipper and advises the user which one to pick up, thus serving as a time-saver. These knobs may be connected to the handle in any desired way, and it is not necessary even to provide any special connection, as the cylindrical portion of the knob, forced into the end of the handle, in which it fits tightly, will be sufficient, in most cases, to hold the knob in place.

Instead of the structure described above, that shown in Fig. 1 may be used. In this, the opening 20 in member 19 is made only large enough to fit part 33 and furnish a bearing therefor. In addition to this and furnishing an end-thrust bearing for the shaft 31, there is a plate 50 having a depression for the reception of the end of the shaft. This plate is secured in position in the sleeve-shaped part 17 of the bridging or connecting element C.

From the foregoing description and the accompanying drawings, it will be apparent that my improved disher can be readily assembled and cheaply manufactured, since it is made largely from stamped parts. It is also obvious that this disher has a water-tight handle and a scraper-actuating mechanism that can be readily disassembled for cleaning purposes and reassembled, since it is necessary only to spring the scraper 28 so as to detach the pin 27 from the opening 26 and pull the shaft 31 out, after having removed the pin 37. To remove this pin, the end 44a is released from notch 43 and the tension of the spring is relieved until the end 44b can be brought out of the notch 45. The pin is now rotated through ninety degrees (90°) until the ends 37b are in alignment with the notches in the bracket 34, when the pin may be withdrawn. When this has been done, the lever 39 or the scraper 28, with its shaft 31, or both, may be removed.

While I have disclosed what is now regarded as the preferred embodiment of this invention, it is of course understood that the specific description of structure set forth herein may be departed from without departing from the spirit of my invention as set forth in this specification and in the appended claims.

Having now described my invention, I claim:

1. A disher of the type described, comprising a bowl, releasing means therein, a tubular handle, bridging means connecting the bowl to the handle, closure means for keeping liquid from entering the handle, said closure means having a separate socket fitting tightly therein, actuating means for the releasing means, a part of the actuating means being mounted and rotatable in said socket, and a lever for operating the actuating means.

2. In a disher, having a bowl, a handle, and means connecting the bowl and handle, the combination of a bracket within said connecting means, a shaft within said connecting means, a lever to cause rotation of said shaft, a pivot pin connected to said bracket, a sleeve pivotally mounted upon said pin, said sleeve and said lever being fixedly connected, and resilient means tending to return said lever to an initial position when displaced therefrom by rotation about said pin, the sleeve and part of the spring moving in harmony with the lever about the pivot pin, the shaft having a transverse circumferential groove opposite the pin and the pin extending into the groove to definitely position the shaft longitudinally.

3. In a disher of the type described, a bowl, a bracket projecting laterally therefrom, a sleeve resting at one end against said bracket, a lever mounted on said sleeve, a pivot pin extending through said sleeve and bracket to secure the sleeve to the bracket in pivotal relation, and a spring coiled around said sleeve and connected, adjacent one end, with the lever, and at the other end, with the pin, the pin having a slot in its end remote from the bracket and a notch in a side wall of said slot for the reception of an end portion of the spring, said notch serving to hold the spring in place on the sleeve and pin.

4. In a disher of the type described, having a bowl, a handle, and connecting means to connect them, a scraper in the bowl to loosen the food product therein and release same from the bowl, a rotatable shaft in the connecting means, said scraper being connected to said shaft for operation thereby, a groove in said shaft extending transversely thereof, a bracket connected to said connecting means and extending approximately parallel to said shaft and toward said handle, a pivot pin extending through said bracket and having its inner end located in said groove to hold the shaft substantially immovable longitudinally.

LOUIS MYERS.